April 22, 1952  J. KAHL ET AL  2,593,889
MACHINE FOR MEASURING AND DISPENSING
VARIABLE VOLUMES OF LIQUIDS
Filed June 20, 1946
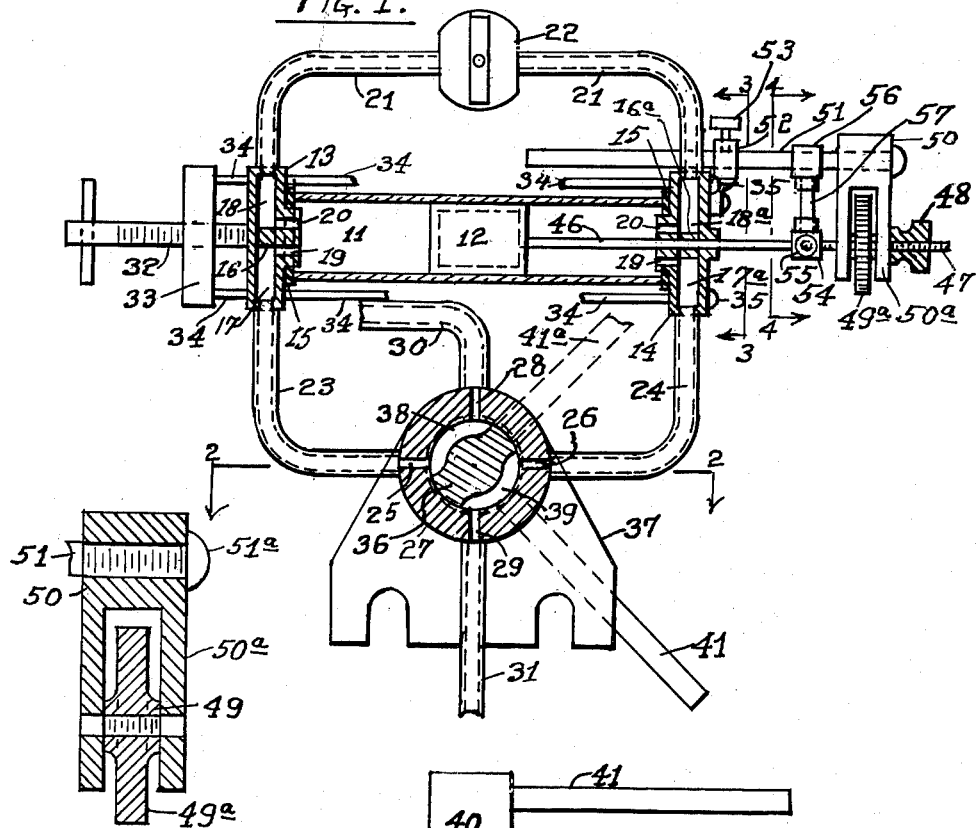
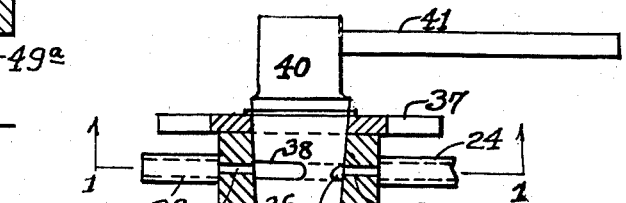
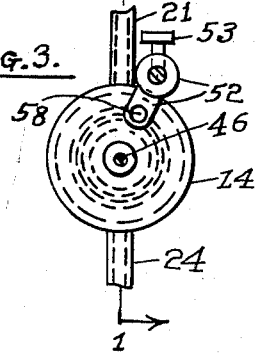
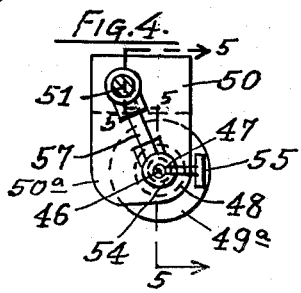
INVENTORS:
Joseph Kahl
and George H. Muller
BY their attorney
Israel Benjamine Patented Apr. 22, 1952

2,593,889

UNITED STATES PATENT OFFICE 2,593,889

MACHINE FOR MEASURING AND DISPENSING VARIABLE VOLUMES OF LIQUIDS

Joseph Kahl and George H. Muller, New York, N. Y.; said Muller assignor to G. M. Manufacturing Company, New York, N. Y.

Application June 20, 1946, Serial No. 677,973

4 Claims. (Cl. 222—250)

This invention relates to improvements in a machine for measuring and dispensing variable volumes of liquids, and it consists in the novel features which are hereinafter described.

One of the objects of the improvement is to provide a means for quickly changing from one volume of liquid to be dispensed by the machine to another required volume.

Another object is to provide a means for adjusting the said required volume with great precision.

A further object is to secure the said desired volume against accidental change.

A still other object is to provide the piston of the measuring cylinder of the machine, which is hereinafter described, with a slidably mounted stop for limiting the position of the piston.

Another object is to have the said stop consist of a rod which is slidably mounted in one end of the cylinder for quickly moving the rod into an approximate limiting position for the said piston and to provide a micrometer thread at the outer end of the rod for more accurately adjusting the said position, and a variably positioned abutment member having mounted therein a threaded means for cooperating with said micrometer thread for moving the said rod in a direction lengthwise thereof.

Other objects and advantages will hereinafter appear.

We attain these objects by the machine which is illustrated in the accompanying drawings or by any mechanical equivalent or obvious modifications of the same.

In the drawings:

Figure 1 is a fragmentary vertical section on the line 1—1 of Figure 2 and on the line 1—1 of Figure 3, looking in the direction of the arrows.

Figure 2 is a fragmentary horizontal section on the line 2—2 of Figure 1, looking in the direction of the arrows.

Figure 3 is a fragmentary section on the line 3—3 of Figure 1; and Figure 4 is a fragmentary section on the line 4—4 of Figure 1, looking in the direction of the arrows.

Figure 5 is a detail in cross-section drawn to a larger scale on the line 5—5—5—5 of Figure 4 of the feed nut which is hereinafter described and the abutment member carrying the same, which is hereinafter described.

Similar numerals refer to similar parts throughout the several views.

11 designates a measuring cylinder for the liquid to be dispensed and measured and 12—a piston, the limiting position of which in the cylinder determines the volume of the dispensed liquid. The cylinder 11 and piston 12 may be made of glass or any other suitable material.

The ends of the cylinder 11 are shown as closed by hollow discs or chambers 13 and 14; packing rings 15 of rubber or other soft material are shown as interposed between the ends of the cylinder 11 and the adjacent sides of the discs 13 and 14.

The discs 13 and 14 are kept in contact with the ends of the cylinder 11 by means of a screw 32, a bar 33 and a pair of rods 34 which pass through the discs 13 and 14 and are anchored against the outer side of the latter by means of heads 35.

The interior of each of the chambers 13 and 14 is divided by walls 16 and 16a respectively into two compartments 17 and 18 and 17a and 18a respectively; the interior of the cylinder 11 communicates with the compartments 17 and 18 and 17a and 18a by means of passages 19 and 20 in the inner wall of each of these compartments.

The compartments 18 and 18a are shown as connected each by means of a tube 21 to an air valve 22 for discharging therethrough any air which may find its way into the system; the compartments 17 and 17a communicate by means of tubes 23 and 24 respectively with passages 25 and 26 respectively of a valve casing 27.

The casing 27 communicates by means of passages 28 and 29 respectively with an inlet 30 and an outlet 31 for the dispensed liquid, which may be conveyed to the machine by gravity or pressure, or both.

The casing 27 encloses a conical valve 36 which is carried by a mounting plate 37 and has thereon on the periphery thereof in a plane transversely thereto a pair of grooves 38 and 39 which communicate alternately with the passages 28 and 25 and with the passages 26 and 29.

In the position shown in Figure 1, the groove 38 communicates with the passages 28 and 25 and the groove 39 communicates with the passages 26 and 29.

The valve 36 has thereon at one end thereof a head 40, which has connected thereto a lever 41, by means of which the valve may be oscillated through an angle of 90 degrees from the position of the lever at 41 to its position shown in dotted lines at 41a.

The lever 41 may be operated by either hand power or foot power or otherwise, if desired, and its extreme positions may be determined by suitable stops which are not shown in the drawings.

The valve 36 is kept against its seat in the casing 27 by a spring 43 encompassing a stem 42 at the other end of the valve 36; said spring is abutting at one end thereof against a nut 44 on the threaded outer end of the stem 42 and at the other end thereof against a cap 45 encompassing the inner end of the stem 42 and abutting against the end of the casing 27, as shown in Figure 2 of the drawings.

In the position of the valve 36 as shown in Figure 1 liquid is or has been flowing from the inlet 30 to the left end of the cylinder 11, thereby moving the piston 12 from the inner wall of the chamber 13 to the inner end of the rod or stop 46; the flow of the liquid is then discontinued after an equal volume of the liquid has simultaneously been discharged from the right end of the cylinder 11 into and through the outlet 31.

The position of the valve 36 may then be changed by turning the lever 41 through an angle of 90 degrees to the position at 41a; the flow of the liquid thereupon proceeds from the inlet 30 to the right hand end of the cylinder 11 and from the left hand end of the cylinder 11 to the outlet 31, thereby moving the piston 12 from the position shown in Figure 1 to the left end of the cylinder, whereupon the flow is discontinued until the lever 41 is again turned from the position at 41a to its original position at 41.

The volume of liquid discharged during a stroke of the piston 12 depends upon the position of the rod or stop 46 the end of which acts as a stop for the piston 12; by moving the rod or stop 46 through the wall 16a to the right or to the left and fixing it in a new position the desired volume of the liquid to be dispensed may thereby be changed.

To effect this change approximately and quickly we provide a sliding fit for the rod or stop 46 through the wall 16a and to accurately adjust the limiting position of the piston 12 we provide an adjusting thread 47 at the outer end of the rod or stop 46; this thread is in mesh with a feed nut 49, which is interiorly threaded and has thereon a knurled disc 49a as shown in Figures 1, 4 and 5.

The feed nut 49 is carried by a bifurcation 50a of an abutment member 50 which is secured to the outer end of a bar 51 which is parallel to the rod or stop 46 and is slidably connected to a bracket 52 which is secured to the outer wall of the chamber 14 by means of a suitable screw 58 as shown in Figures 1 and 3.

The bar 51 is detachably secured to the bracket 52 by means of a screw 53, and, when free to move in the bracket 52, the bar 51 may be moved together with the rod or stop 46 for locating the approximate position of the piston 12; the bar 51 is then secured to the said bracket 52 and the bifurcation 50a on the member 50 then serves as an abutment for the nut 49 which, when turned, feeds the adjusting screw 47 in a desired direction, whereby the position of the piston 12 may be accurately located and the volumes of the liquid to be drawn from the cylinder 11 exactly determined.

When the adjustment of the position of the piston 12 is completed, the threaded end 47 of the rod or stop 46 and feed nut 49 may be immobilized by means of a lock nut 48 on the said threaded end 47 which may be brought into forced contact with the outer branch of the bifurcation 50a, as shown in Figure 1.

To keep the threaded end 47 of the rod or stop 46 from being rotated by the nut 49, a collar 54 is secured to the rod or stop 46, as by means of a screw 55 or otherwise, and the collar 54 is connected by means of a rod 57 to a sleeve 56 which is slidably mounted on the bar 51, whereby the rod or stop 46 with the threaded end 47 thereon may be moved by the nut 49 in a direction lengthwise the bar 51 without rotating the threaded end 47 of the rod or stop 46 when the said nut 49 is turned.

Variations are possible and parts of our invention may be used without other parts.

We do not, therefore, restrict ourselves to the details as shown in the drawings.

We claim as our invention and desire to secure by Letters Patent:

1. In a machine for measuring and dispensing variable volumes of liquid, a cylinder, a piston slidably mounted therein, a means for admitting liquid into one end of the cylinder and for discharging it therefrom, the piston to be moved by the liquid, and a stop means in said cylinder for limiting the stroke of the piston, the stop means being integral with a rod slidably connected to the cylinder and terminating at the inner end thereof in said stop means, said rod being threaded at its outer end, combined with an abutment member having thereon a part which is freely slidably connected to a part on the cylinder, a means for detachably connecting the abutment member to the said part of the cylinder, said member, when detached from said part, being disposed to be freely slid by a nonrotary motion in a plane parallel to the cylinder, a nut carried by said member in mesh with the threaded outer end of said rod, and a means for imparting relative rotation to said rod and nut with reference to each other for adjustably varying the position of said rod lengthwise thereof with relation to the abutment member, whereby, for changing the volume of liquid to be admitted to the cylinder, the abutment member may be detached from said part of the cylinder and freely slid with said rod by a nonrotary motion to an approximately limiting position of the stop means for the piston in the cylinder, whereupon the abutment member may be reattached with relation to the cylinder and the exact position of the said rod lengthwise thereof may then be accurately adjusted by the relative rotation of said nut and said rod with reference to each other through a limited distance and in a relatively short time for the exact limiting position of the said stop means.

2. In a machine for measuring and dispensing variable volumes of liquids, a cylinder, a piston slidably mounted therein, a means for admitting liquid into one end of the cylinder and for discharging it therefrom, the said means to be moved by the liquid, and a stop means in said cylinder for limiting the stroke of the piston, whereby to determine the desired volume of liquid to be admitted to the cylinder during the stroke of the piston, the said stop means being integral with a rod slidably connected to the cylinder and terminating at the inner end thereof in said stop means, said rod being threaded at its outer end, combined with a bar freely slidably connected at its inner end to said cylinder, a means for detachably fastening the said bar to the cylinder, an abutment member at the outer end of the bar integral therewith, a nut carried by said member in contact therewith and in mesh with the threaded outer end of said rod, said bar when detached being disposed to be freely slid by a nonrotary motion in a plane parallel to the cylinder, and a means for imparting relative rotation to said rod and nut with reference to each other for adjustably varying the position of the rod lengthwise thereof with relation to the bar, whereby, for changing the volume of liquid to be admitted to the cylinder, the bar may be detached from the cylinder and with said rod may be freely slid by a nonrotary motion to an approximately limiting position of the stop means for the piston in the cylinder whereupon the bar may be reattached to the cylinder and the exact position of the said rod lengthwise thereof may then be accurately adjusted by the mutual relative rotation of said nut and said rod with reference to each other through a limited distance and in a relatively short time for the exact limiting position of the said stop means.

3. In a machine for measuring and dispensing variable volumes of liquids a cylinder, a piston slidably mounted therein, a means for admitting liquid into one end of the cylinder and for discharging it therefrom, the said piston to be moved by the liquid, and a stop means in said cylinder for limiting the stroke of the piston, whereby to determine the desired volume of liquid to be admitted to the cylinder during the stroke of the piston, the said stop means being integral with a rod slidably connected to the cylinder and terminating at the inner end thereof in said stop means, combined with a means for quickly changing the position of the stop means, comprising a bar parallel to said rod, freely slidably connected at its inner end to the cylinder and terminating at the outer end thereof in an abutment member, a means for detachably fastening the said bar to the cylinder, the said rod being threaded at its outer end, a feed nut carried by said member in contact therewith and in mesh with said outer end, the said bar when detached being disposed to be freely slid by a nonrotary motion in a plane parallel to the cylinder, whereby, for changing the volume of liquid to be admitted to the cylinder, the said bar may be detached from the cylinder and with said rod may be freely slid by a nonrotary motion to an approximately limiting position of the stop means, whereupon, the said bar may be reattached to the cylinder and the exact position of the rod, lengthwise thereof may then be accurately adjusted by the said feed nut through a limited distance in a relatively short time for the exact limiting position of the stop means.

4. In a machine for measuring and dispensing variable volumes of liquids a cylinder, a piston slidably mounted therein, a means for admitting liquid into one end of the cylinder and for discharging it therefrom, the said means to be moved by the liquid, and a stop means in the cylinder for limiting the stroke of the piston, whereby to determine the desired volume of liquid to be admitted to the cylinder during the stroke of the piston, the said stop means to be integral with a rod threaded at the outer end thereof and slidably connected to the cylinder, said rod terminating at the inner end thereof in said stop means, combined with a bar freely slidably connected at its inner end to the cylinder and detachably fastened thereto, said bar when detached being disposed to be freely slid by a nonrotary motion parallel to the cylinder and said bar terminating at the outer end thereof in a bifurcated member, an interiorly threaded disc rotatably connected to the bifurcation and placed between the two branches thereof in alternate abutment with each of said branches, the interior thread of the disc being in mesh with the threaded outer end of the rod, and a means to prevent the rotation of the rod with relation to the cylinder, whereby, for changing the volume of liquid to be admitted to the cylinder, the bar may be detached from the cylinder and with said rod may be freely slid by a nonrotary motion to an approximately limiting position of the stop means for the piston of the cylinder, whereupon the bar may be reattached to the cylinder and the exact limiting position of the rod lengthwise thereof adjusted by rotation of the said disc through a limited distance and in a relatively short time.

JOSEPH KAHL.
GEORGE H. MULLER.

REFERENCES CITED

The following references are of record in the file of this patent:

UNITED STATES PATENTS

| Number | Name | Date |
|---|---|---|
| 939,382 | Beard | Nov. 9, 1909 |
| 1,181,259 | Sailer | May 2, 1916 |
| 2,300,110 | De Hoog | Oct. 27, 1942 |